United States Patent
Mouri et al.

(10) Patent No.: US 12,330,554 B2
(45) Date of Patent: Jun. 17, 2025

(54) DISPLAY APPARATUS FOR VEHICLE

(71) Applicants: Fumihiko Mouri, Owariasahi (JP); Kentaro Mori, Tokyo (JP)

(72) Inventors: Fumihiko Mouri, Owariasahi (JP); Kentaro Mori, Tokyo (JP)

(73) Assignees: TOYOTA JIDOSHA KABUSHIKI KAISHA, Aichi-Ken (JP); STANLEY ELECTRIC CO., LTD., Tokyo (JP)

( * ) Notice: Subject to any disclaimer, the term of this patent is extended or adjusted under 35 U.S.C. 154(b) by 43 days.

(21) Appl. No.: 18/448,985

(22) Filed: Aug. 14, 2023

(65) Prior Publication Data

US 2024/0051460 A1 Feb. 15, 2024

(30) Foreign Application Priority Data

Aug. 15, 2022 (JP) .................................. 2022-129211

(51) Int. Cl.
*B60Q 1/26* (2006.01)
*B60Q 1/50* (2006.01)

(52) U.S. Cl.
CPC ............ *B60Q 1/50* (2013.01); *B60Q 2400/50* (2013.01)

(58) Field of Classification Search
CPC .............................. B60Q 1/50; B60Q 2400/50
See application file for complete search history.

(56) References Cited

U.S. PATENT DOCUMENTS

| | | | |
|---|---|---|---|
| 5,969,603 A * | 10/1999 | Wang | B60Q 1/52 340/471 |
| 8,954,252 B1 * | 2/2015 | Urmson | G08G 1/167 701/301 |
| 9,958,870 B1 * | 5/2018 | Graybill | G05D 1/02 |
| 10,118,548 B1 * | 11/2018 | Fields | G08G 1/005 |
| 10,261,513 B2 * | 4/2019 | Reiley | B60Q 1/50 |
| 10,706,719 B2 * | 7/2020 | Zhang | G03B 29/00 |
| 10,780,822 B1 * | 9/2020 | Salter | G06V 40/16 |
| 11,238,734 B2 * | 2/2022 | Fleming | G08G 1/096838 |
| 11,270,589 B2 * | 3/2022 | Shimizu | B60R 1/28 |
| 11,440,469 B2 * | 9/2022 | Ahn | B60Q 1/085 |
| 11,697,346 B1 * | 7/2023 | Weiss | G06V 20/588 345/589 |
| 2003/0067763 A1 * | 4/2003 | Fukawa | B60Q 1/18 362/40 |
| 2007/0280503 A1 * | 12/2007 | Kubota | B60Q 1/543 382/103 |
| 2008/0055192 A1 * | 3/2008 | Nagano | G02B 27/01 701/300 |
| 2009/0091474 A1 * | 4/2009 | Konforty | G08G 1/095 340/907 |

(Continued)

FOREIGN PATENT DOCUMENTS

JP 2016-055691 A 4/2016

*Primary Examiner* — Quang Pham
(74) *Attorney, Agent, or Firm* — HAUPTMAN HAM, LLP (57) ABSTRACT

A vehicle has a function of drawing a notification display on a road surface with light. In a case where a shift position of the vehicle is a P range and a switch for turning off the drawing is selected, it is permitted to turn off the light of the drawing of the notification display. As another condition, in a case where there is no approaching object around the vehicle when the vehicle moves rearward and the switch for turning off the drawing is selected, it is permitted to turn off the light of the drawing of the notification display.

12 Claims, 4 Drawing Sheets

(56) References Cited

U.S. PATENT DOCUMENTS

| | | | |
|---|---|---|---|
| 2010/0253539 A1* | 10/2010 | Seder | G01C 21/365 340/902 |
| 2012/0300078 A1* | 11/2012 | Ogata | G06V 40/10 348/148 |
| 2015/0075954 A1* | 3/2015 | Mizuno | B60Q 1/343 200/61.3 |
| 2015/0194053 A1* | 7/2015 | Jensen | B60Q 1/442 340/944 |
| 2017/0008517 A1* | 1/2017 | Himi | G01S 15/87 |
| 2017/0140651 A1* | 5/2017 | Lee | B60Q 1/324 |
| 2017/0203685 A1* | 7/2017 | Hirai | B60Q 1/0023 |
| 2017/0210282 A1* | 7/2017 | Rodriguez Barros | B60Q 1/324 |
| 2017/0240096 A1* | 8/2017 | Ross | G05D 1/0212 |
| 2017/0255093 A1* | 9/2017 | Fujita | G01S 13/931 |
| 2017/0259728 A1* | 9/2017 | Nagata | G06V 20/58 |
| 2017/0259731 A1* | 9/2017 | Son | B60Q 1/48 |
| 2017/0267167 A1* | 9/2017 | Sakata | B60Q 1/247 |
| 2017/0337821 A1 | 11/2017 | Masuda et al. | |
| 2018/0004020 A1* | 1/2018 | Kunii | G03B 21/12 |
| 2018/0012427 A1* | 1/2018 | Ricci | A61B 5/1171 |
| 2018/0033306 A1* | 2/2018 | Kim | G06V 40/103 |
| 2018/0072218 A1* | 3/2018 | Sweeney | B60Q 1/545 |
| 2018/0079284 A1* | 3/2018 | Choi | E05F 15/75 |
| 2018/0082588 A1* | 3/2018 | Hoffman, Jr | G08G 1/168 |
| 2018/0093613 A1* | 4/2018 | Timoneda | H04N 7/181 |
| 2018/0118099 A1* | 5/2018 | Kunii | B60K 37/20 |
| 2018/0174460 A1* | 6/2018 | Jung | G08G 1/16 |
| 2018/0288371 A1* | 10/2018 | Nose | H04N 7/181 |
| 2018/0319325 A1* | 11/2018 | Tatara | B60Q 1/2696 |
| 2018/0373992 A1* | 12/2018 | Yin | G06V 10/25 |
| 2019/0005812 A1* | 1/2019 | Matus | G06V 20/584 |
| 2019/0071075 A1* | 3/2019 | Mimura | G06V 20/58 |
| 2019/0078373 A1* | 3/2019 | Schulz | B60Q 1/0023 |
| 2019/0120370 A1* | 4/2019 | Dimig | F16H 59/12 |
| 2019/0236938 A1* | 8/2019 | Ekladyous | B60Q 1/547 |
| 2019/0241188 A1* | 8/2019 | Tsuchiya | B60W 30/18163 |
| 2019/0315269 A1* | 10/2019 | Kishigami | B60Q 1/346 |
| 2020/0101969 A1* | 4/2020 | Natroshvili | B60W 60/00276 |
| 2020/0114813 A1* | 4/2020 | Lujan | B60Q 1/0035 |
| 2020/0269747 A1* | 8/2020 | Kusayanagi | B60K 35/00 |
| 2020/0384913 A1* | 12/2020 | Nobuhara | B60Q 1/0035 |
| 2021/0094579 A1* | 4/2021 | Aoki | B60Q 1/32 |
| 2021/0188159 A1* | 6/2021 | Fukutaka | B60Q 1/46 |
| 2021/0306618 A1* | 9/2021 | Sugiyama | H04N 13/398 |
| 2021/0347259 A1* | 11/2021 | Shibata | G08G 1/166 |
| 2021/0355738 A1* | 11/2021 | Jang | B60Q 1/32 |
| 2022/0012988 A1* | 1/2022 | Avadhanam | G08G 1/166 |
| 2022/0219599 A1* | 7/2022 | Mochizuki | B60Q 1/507 |
| 2022/0381415 A1* | 12/2022 | Tatara | B60Q 1/50 |
| 2023/0107328 A1* | 4/2023 | Mouri | B60Q 1/442 340/468 |
| 2023/0150422 A1* | 5/2023 | Mouri | B60Q 1/34 340/475 |
| 2023/0271548 A1* | 8/2023 | Shibata | B60Q 1/543 340/468 |
| 2024/0059214 A1* | 2/2024 | Suzuki | F21S 43/14 |
| 2024/0278716 A1* | 8/2024 | Mouri | B60Q 1/381 |

\* cited by examiner

DISPLAY APPARATUS FOR VEHICLE

CROSS REFERENCE TO RELATED APPLICATION

This application claims priority to Japanese Patent Application No. 2022-129211 filed on Aug. 15, 2022, which is incorporated herein by reference in its entirety including the specification, claims, drawings, and abstract.

TECHNICAL FIELD

The present disclosure relates to a display apparatus for a vehicle that is mounted on a vehicle and draws a notification display on a road surface with light.

BACKGROUND

There is known a display apparatus for a vehicle that draws a notification display (for example, a character, a figure, or the like) on a road surface with light. By drawing the notification display on the road surface, for example, it is possible to notify other traffic users (pedestrians, other vehicles, and the like) of the presence of the vehicle.

JP 2016-55691 A describes a display apparatus for a vehicle having a function of turning off drawing of a notification display by a driver.

The display apparatus for a vehicle described in JP 2016-55691 A makes it possible, when the driver turns off the drawing of the notification display, to eliminate inconvenience of drawing the notification display when the drawing of the notification display is unnecessary (for example, when a situation is one where the notification display is not notified to other traffic users, when the driver does not want to draw the notification display, or the like).

However, when the driver turns off the drawing of the notification display in the display apparatus for a vehicle described in JP 2016-55691 A, the notification display is no longer drawn in any situation. Therefore, there is a possibility that an advantage of mounting the display apparatus for a vehicle on a vehicle cannot be obtained. For example, in a situation where it is necessary to notify other traffic users of the presence of the vehicle, the notification can no longer be performed.

An object of the present disclosure is to achieve, with a display apparatus for a vehicle configured to draw a notification display on a road surface with light, both drawing the notification display when the drawing of the notification display is necessary and reducing the inconvenience of drawing the notification display when the drawing of the notification display is unnecessary.

SUMMARY

One aspect of the present disclosure is a display apparatus for a vehicle including: a road surface drawing unit that is mounted on a vehicle and configured to draw a notification display on a road surface with light; and a control unit configured to permit turning off the light of the drawing in one of a case where a shift position of the vehicle is a P range and a switch for turning off the drawing is selected and a case where there is no approaching object around the vehicle when the vehicle moves rearward and the switch for turning off the drawing is selected.

In a case where the shift position of the vehicle is the P range or in a case where there is no approaching object around the vehicle when the vehicle moves rearward, since it is less necessary to call for attention by the notification display, it is less necessary to draw the notification display. Therefore, in each of the above cases it is permitted to turn off the light of the drawing of the notification display, whereby it is possible to reduce the inconvenience of drawing the notification display when the notification display does not need to be drawn. In addition, the light of the drawing of the notification display is not turned off by only selecting the switch for turning off the drawing. As a result, the notification display can be drawn when the notification display needs to be drawn.

The display apparatus for a vehicle configured to draw a notification display on a road surface with light according to the present disclosure makes it possible to achieve both drawing the notification display when the drawing of the notification display is necessary and reducing the inconvenience of drawing the notification display when the drawing of the notification display is unnecessary.

DESCRIPTION OF EMBODIMENTS

Figure 1:
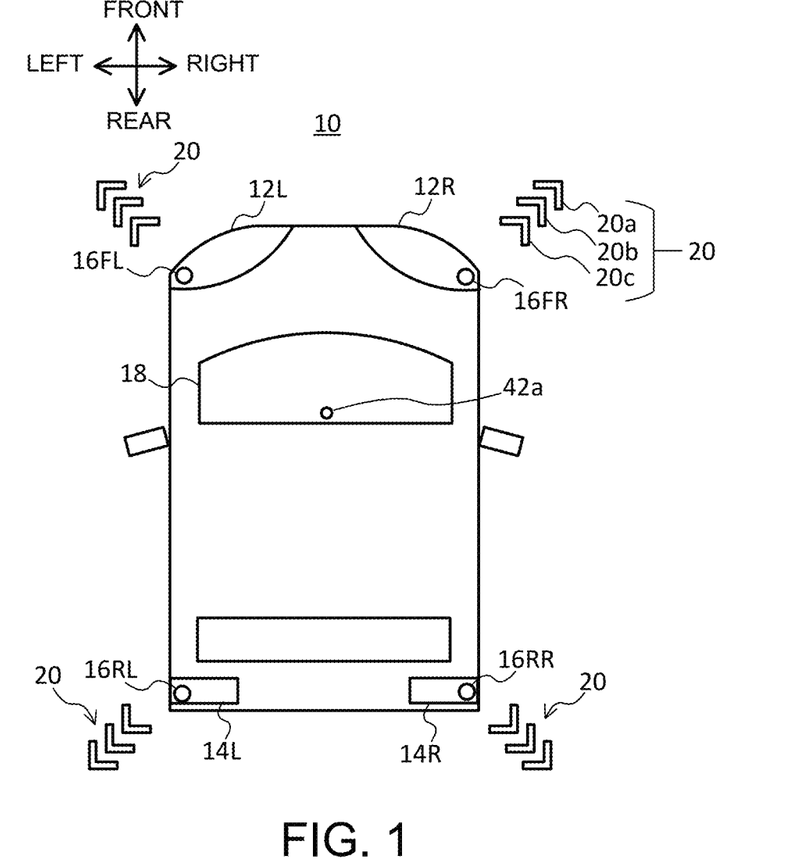
FIG. 1 is a diagram illustrating notification displays in four directions of front, rear, left, and right when a vehicle is viewed from above.

With reference to FIG. 1, a vehicle 10 on which display apparatuses for a vehicle 16FR, 16FL, 16RR, and 16RL according to an embodiment are mounted will be described.

FIG. 1 is the diagram of the vehicle 10 as viewed from above. The vehicle 10 is an automobile.

A pair of left and right headlights 12R and 12L are provided in a front portion of the vehicle 10, and a pair of left and right rear combination lamps 14R and 14L are provided in a rear portion of the vehicle 10.

The headlight 12R is provided with the display apparatus for a vehicle 16FR. The display apparatus for a vehicle 16FR is an apparatus configured to irradiate a road surface in front of the vehicle 10 or a road surface on a front right side thereof with light. The headlight 12L is provided with the display apparatus for a vehicle 16FL. The display apparatus for a vehicle 16FL is an apparatus configured to irradiate a road surface in front of the vehicle 10 or a road surface on a front left side thereof with light.

The rear combination lamp 14R is provided with the display apparatus for a vehicle 16RR. The display apparatus for a vehicle 16RR is an apparatus configured to irradiate a road surface in rear of the vehicle 10 or a road surface on a rear right side thereof with light. The rear combination lamp 14L is provided with the display apparatus for a vehicle 16RL. The display apparatus for a vehicle 16RL is an apparatus configured to irradiate a road surface in rear of the vehicle 10 or a road surface on a rear right side thereof with light.

Hereinafter, in a case where it is not necessary to distinguish the display apparatuses for a vehicle 16FR, 16FL, 16RR, and 16RL, each of the display apparatuses for a vehicle 16FR, 16FL, 16RR, and 16RL are referred to as the "display apparatus for a vehicle 16."

The display apparatus for a vehicle 16 draws the notification display 20 on the road surface by irradiating the road surface with light. The notification display 20 includes, for example, marks 20a, 20b, and 20c arranged in a line. Each of the marks 20a, 20b, and 20c has a shape of the tip of an arrow. The shape of each mark illustrated in FIG. 1 is merely an example, and each mark may have a shape other than the illustrated shape. In addition, the number of marks is merely an example, and the notification display 20 may include one or a plurality of marks.

Figure 2:
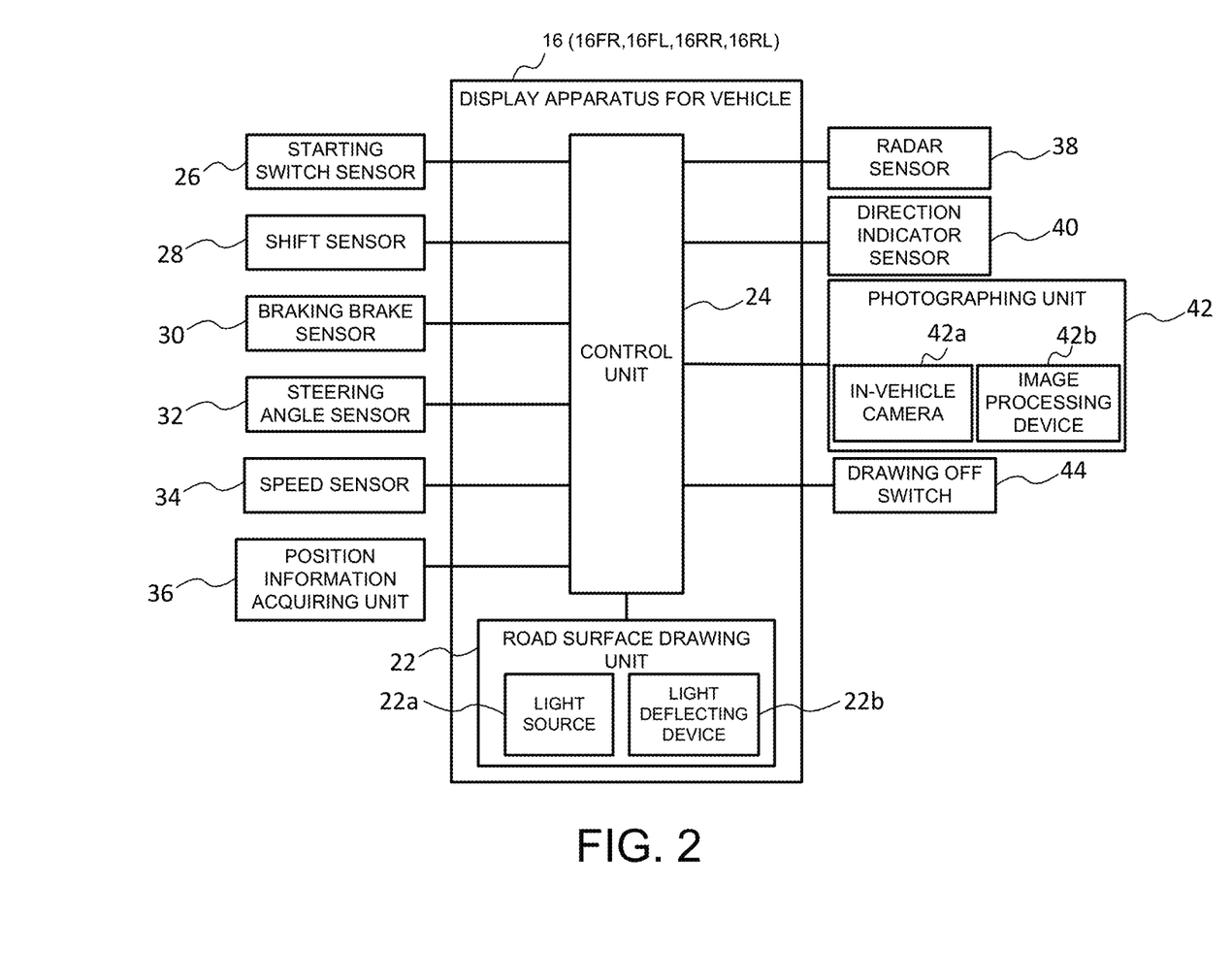
FIG. 2 is a block diagram illustrating a display apparatus for a vehicle.

Hereinafter, a configuration of the display apparatus for a vehicle 16 will be described with reference to FIG. 2. FIG. 2 is a block diagram illustrating the configuration of the display apparatus for a vehicle 16.

The display apparatus for a vehicle 16 includes a road surface drawing unit 22 and a control unit 24. A starting switch sensor 26, a shift sensor 28, a braking brake sensor 30, a steering angle sensor 32, a speed sensor 34, a position information acquiring unit 36, a radar sensor 38, a direction indicator sensor 40, a photographing unit 42, and a drawing off switch 44 are provided in the vehicle 10 and output signals to the control unit 24.

The road surface drawing unit 22 includes a light source 22a and a light deflecting device 22b, and draws the notification display 20 on the road surface by irradiating the road surface with light from the light source 22a. The road surface drawing unit 22 can change the brightness, color, shape, irradiation position, and irradiation range of the light to be emitted.

As the light source 22a, for example, a semiconductor light emitting element such as a light emitting diode (LED), a laser diode (LD), or an electro luminescence (EL) element, a light bulb, a halogen lamp, or an incandescent lamp is used.

The light deflecting device 22b emits light from the light source 22a to the outside of the display apparatus for a vehicle 16. As the light deflecting device 22b there is used, for example, a digital mirror device (DMD) that is an example of a micro mirror device, optical micro electro mechanical systems (MEMS), a polygon mirror, DLP (registered trademark), or the like.

The road surface drawing unit 22 is configured to swing by a motor or the like. The road surface drawing unit 22 of each of the display apparatuses for a vehicle 16FR and 16FL is controlled by the control unit 24, and can tilt up, down, left, and right to switch a direction in which the light is emitted to the road surface to the front side or the obliquely front side of the vehicle 10. The road surface drawing units 22 of the display apparatuses for a vehicle 16RR and 16RL are controlled by the control unit 24, and can tilt up, down, left, and right to switch a direction in which the light is emitted to the road surface to the rear or the obliquely rear of the vehicle 10.

The control unit 24 controls the drawing of the notification display 20 by the road surface drawing unit 22. For example, the control unit 24 determines whether it is necessary to draw the notification display 20, on the basis of output from at least one of the starting switch sensor 26, the shift sensor 28, the braking brake sensor 30, the steering angle sensor 32, the speed sensor 34, the position information acquiring unit 36, the radar sensor 38, the direction indicator sensor 40, and the photographing unit 42. The control unit 24 causes the road surface drawing unit 22 to draw the notification display 20 in a case where the drawing is necessary. The control unit 24 does not cause the road surface drawing unit 22 to draw the notification display 20 in a case where the drawing is unnecessary.

The starting switch sensor 26 detects on and off of a start switch (for example, an ignition switch or a start switch) of the vehicle 10 and outputs a result of the detection to the control unit 24.

The shift sensor 28 detects whether a position (shift position) of a shift lever of the vehicle 10 is one of a position of a D range (drive range) (forward movement position, a position of an R range (reverse range) (reward movement position), a position of a P range (parking range), and the like. Then, the shift sensor 28 outputs a result of the detection to the control unit 24.

The braking brake sensor 30 detects on (braking state) and off (release state) of a braking brake (for example, a foot brake, a hand brake, and an automatic brake in an automatic driving system) of the vehicle 10, and outputs a result of the detection to the control unit 24.

The steering angle sensor 32 detects straight traveling, rightward steering, or leftward steering of the vehicle 10, and outputs a result of the detection to the control unit 24. For example, on the basis of a steering angle of a steering wheel when the vehicle 10 travels straight, a steering angle in a case where steering in a right-turn direction is performed is defined as a positive angle, and a steering angle in a case where steering in a left-turn direction is performed is defined as a negative angle. The steering angle sensor 32 detects a positive steering angle as rightward steering of the vehicle 10, and detects a negative steering angle as leftward steering of the vehicle 10.

The speed sensor 34 detects a speed of vehicle 10, and outputs a result of the detection to the control unit 24. In addition, the speed sensor 34 detects acceleration (for example, acceleration G during acceleration and deceleration G during deceleration) of vehicle 10, and outputs a result of the detection to the control unit 24.

The position information acquiring unit 36 acquires position information of the vehicle 10 using a satellite positioning system such as a global navigation satellite system (GNSS) or a global positioning system (GPS), and outputs the position information to the control unit 24.

The radar sensor 38 is a microwave radar sensor, a millimeter wave radar sensor, or the like, detects, for example, an object (other vehicles, people, animals, and other obstacles) present in each of the front, side, and rear of the vehicle 10, and outputs a result of the detection to the control unit 24.

The direction indicator sensor 40 detects on and off of a switch of a direction indicator mounted on the vehicle 10, and outputs a result of the detection to the control unit 24.

The photographing unit 42 includes an in-vehicle camera 42a and an image processing device 42b, and generates an image (for example, a moving image or a still image) by photographing with the in-vehicle camera 42a.

As illustrated in FIG. 1, the in-vehicle camera 42a is provided, for example, on an upper portion of a windshield 18, and photographs the front of the vehicle 10. This arrangement is merely an example, and the in-vehicle camera 42a may be built in the headlights 12R and 12L, or may be provided on an upper surface of a ceiling of the vehicle 10, a hood, a door mirror, or the like. In addition, an in-vehicle camera configured to photograph a side of the vehicle 10 and an in-vehicle camera configured to photograph the rear of the vehicle 10 are provided on the upper surface of the ceiling of the vehicle 10, the hood, the door mirror, and the like. An in-vehicle camera may be provided on each of the rear combination lamps 14R and 14L.

The image processing device 42b analyzes an image generated by photographing with the in-vehicle camera and outputs a result of the analysis to the control unit 24. For example, the image processing device 42b detects an object (other vehicles, people, animals, signs, and other obstacles) shown in an image by analyzing the image, and outputs a result of the detection to the control unit 24.

The control unit 24 may acquire an image generated by photographing with a road monitoring camera via a communication path such as the Internet.

The drawing off switch 44 is a switch for turning off a function of drawing by the road surface drawing unit 22. When the drawing off switch 44 is turned on, an instruction to turn off the function of drawing is given. The drawing off switch 44 may be a physical switch provided in a vehicle interior or a switch of software displayed on a display provided in the vehicle interior.

In the present embodiment, simply turning on the drawing off switch 44 does not turn off the function of drawing by the road surface drawing unit 22. In a case where one of a first lights-out condition and a second lights-out condition to be described below is satisfied, the control unit 24 permits turning off the light of the drawing by the road surface drawing unit 22.

The first lights-out condition is a condition that the shift position of the vehicle 10 is the P range and the switch for turning off the drawing by the road surface drawing unit 22 is selected. In other words, in a case where the shift position of the vehicle 10 is the P range and the switch for turning off the drawing by the road surface drawing unit 22 is selected, the control unit 24 permits turning off the light of the drawing by the road surface drawing unit 22. In this case, the control unit 24 outputs a lights-out instruction to the road surface drawing unit 22, and the road surface drawing unit 22 turns off the light of the notification display 20. The case where the shift position is the P range is a case where a state of the vehicle 10 is a parking state. The case where the switch for turning off the drawing by the road surface drawing unit 22 is selected is a case where the drawing off switch 44 is turned on.

The second lights-out condition is a condition that there is no approaching object around the vehicle 10 when the vehicle 10 moves rearward and the switch for turning off the drawing by the road surface drawing unit 22 is selected. In other words, in a case where there is no approaching object around the vehicle 10 when the vehicle 10 moves rearward and the switch for turning off the drawing by the road surface drawing unit 22 is selected, the control unit 24 permits turning off the light of the drawing by the road surface drawing unit 22. As a result, the road surface drawing unit 22 turns off the light of the notification display 20.

The expression "around the vehicle 10" refers to a range less than or equal to a predetermined distance from a position of the vehicle 10. The control unit 24 determines whether there is an approaching object around the vehicle 10 on the basis of the result of the detection by the radar sensor 38 and the result of the detection by the image processing device 42b. The approaching object is a pedestrian, a vehicle, or the like approaching the vehicle 10 around the vehicle 10.

A situation in which the first lights-out condition or the second lights-out condition is satisfied corresponds to a situation in which it is unnecessary to draw the notification display 20. For example, in a case where the shift position is the P range, since the vehicle 10 is stopped, it is less necessary to draw the notification display 20. Therefore, in a case where the first lights-out condition is satisfied, the control unit 24 permits turning off the light of the notification display 20. In addition, in a case where there is no approaching object around the vehicle 10 when the vehicle 10 moves rearward, since it is less necessary to call for attention, it is less necessary to draw the notification display 20. Therefore, in a case where the second lights-out condition is satisfied, the control unit 24 permits turning off the light of the notification display 20.

In a case where neither the first lights-out condition nor the second lights-out condition is satisfied, the control unit 24 causes the road surface drawing unit 22 to draw the notification display 20 when a turn signal switch or a hazard switch is pressed, when the reverse range is selected, or the like.

Figure 3:
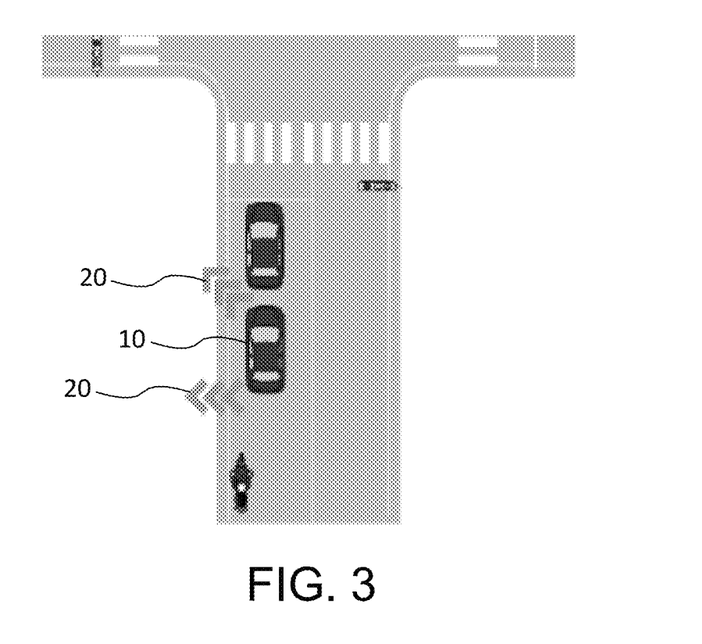
FIG. 3 is an explanatory diagram of an example of an embodiment in which notification displays are drawn on a road surface.
Figure 4:
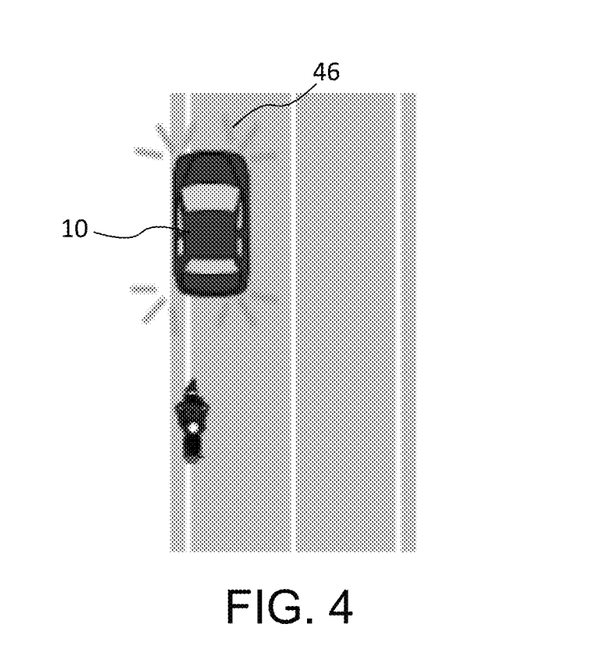
FIG. 4 is an explanatory diagram of an example of the embodiment in which the light of drawing is turned off according to a first lights-out condition.

Hereinafter, with reference to FIGS. 3 and 4, the control of the drawing according to the first lights-out condition will be described. FIG. 3 is an explanatory diagram of an example of the embodiment in which the notification display 20 is drawn on a road surface. FIG. 4 is an explanatory diagram of an example of the embodiment in which the light of the drawing is turned off according to the first lights-out condition.

In the example illustrated in FIG. 3, the drawing off switch 44 is turned on. For example, a driver turns on the drawing off switch 44. In addition, the shift position is the D range. Even if the drawing off switch 44 is turned on, the first lights-out condition is not satisfied in a case where the shift position is the D range. In this case, the control unit 24 does not permit turning off the light of the drawing by the road surface drawing unit 22.

For example, the control unit 24 determines whether it is necessary to draw the notification display 20, on the basis of output from at least one of the starting switch sensor 26, the shift sensor 28, the braking brake sensor 30, the steering angle sensor 32, the speed sensor 34, the position information acquiring unit 36, the radar sensor 38, the direction indicator sensor 40, and the photographing unit 42. Then, the control unit 24 controls the drawing of the notification display 20 by the road surface drawing unit 22 according to a result of the determination. For example, in a case where the driver selects the turn signal switch, the hazard switch, the reverse range, or the like, the control unit 24 determines that it is necessary to draw the notification display 20, and causes the road surface drawing unit 22 to draw the notification display 20.

In the example illustrated in FIG. 4, the drawing off switch 44 is turned on, and the shift position is the P range. Since the first lights-out condition is satisfied, the control unit 24 turns off the light of the drawing of the notification display 20 by the road surface drawing unit 22. Note that in the example illustrated in FIG. 4, a hazard lamp 46 is turned on.

Figure 5:
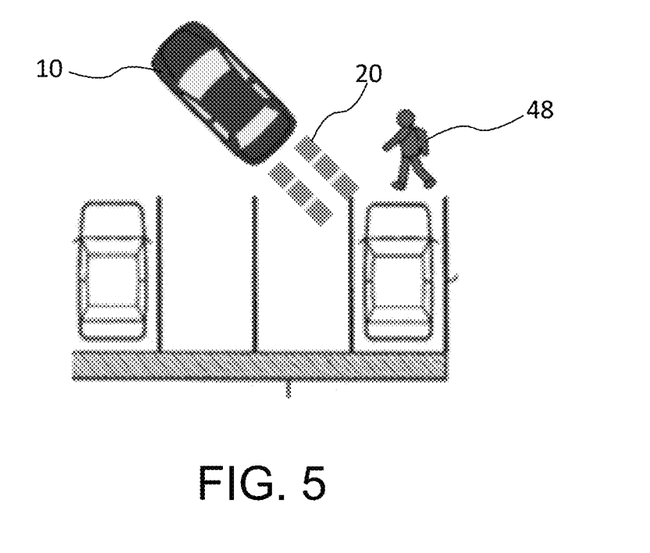
FIG. 5 is an explanatory diagram of an example of the embodiment in which a notification display is drawn on a road surface.
Figure 6:
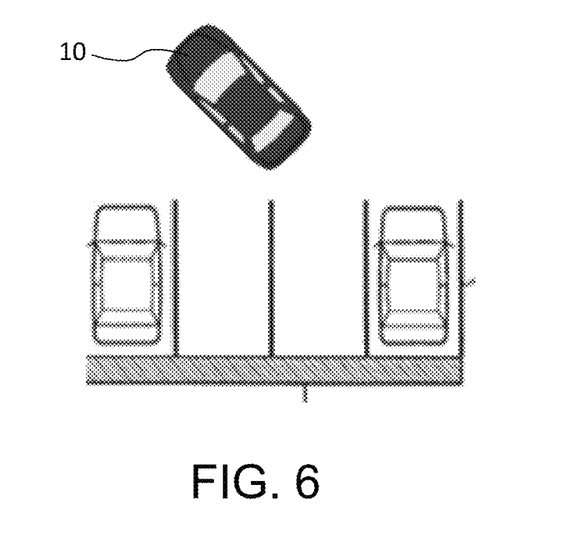
FIG. 6 is an explanatory diagram of an example of the embodiment in which the light of drawing is turned off according to a second lights-out condition.

Hereinafter, with reference to FIGS. 5 and 6, the control of the drawing according to the second lights-out condition will be described. FIG. 5 is an explanatory diagram of an example of the embodiment in which the notification display 20 is drawn on a road surface. FIG. 6 is an explanatory diagram of an example of the embodiment in which the light of the drawing is turned off according to the second lights-out condition.

In the example illustrated in FIG. 5, the drawing off switch 44 is turned on, and the vehicle 10 moves rearward. In addition, an approaching object present around the vehicle 10 (for example, a pedestrian 48 approaching the vehicle 10) is detected. In this case, even if the drawing off switch 44 is turned on, the second lights-out condition is not satisfied. Therefore, the control unit 24 does not permit turning off the light of the drawing by the road surface drawing unit 22. In the example illustrated in FIG. 5, the control unit 24 determines that it is necessary to draw the notification display 20, and causes the road surface drawing unit 22 to draw the notification display 20.

In the example illustrated in FIG. 6, the drawing off switch 44 is turned on, and there is no approaching object around the vehicle 10. Since the second lights-out condition is satisfied, the control unit 24 turns off the light of the drawing of the notification display 20 by the road surface drawing unit 22.

In the display apparatus for a vehicle 16 according to the present embodiment, it is not permitted to turn off the light of the drawing of the notification display 20 in a case where neither the first lights-out condition nor the second lights-out condition is satisfied even if the drawing off switch 44 is turned on. Therefore, the notification display 20 can be drawn when the notification display 20 should be drawn, for example, when it is necessary to call for attention or the like. In addition, in a case where one of the first lights-out condition and the second lights-out condition is satisfied, since it is less necessary to draw the notification display 20, it is permitted to turn off the light of the notification display 20. As a result, it is possible to reduce inconvenience of drawing the notification display 20 when the notification display 20 does not need to be drawn.

The vehicle 10 may be a vehicle equipped with automatic driving technology. The automatic driving technology is technology for supporting driving by the driver, technology for partially automating driving, technology for automating driving with conditions, technology for completely automating driving, or the like.

For example, in a case where a function of the automatic driving is turned off (that is, in a case where a driving mode of the vehicle 10 is a non-automatic driving mode), it is permitted to turn off the light of the notification display 20 when one of the first lights-out condition and the second lights-out condition is satisfied.

The control unit 24 can be achieved by using hardware resources such as a processor, an electronic circuit, and the like, and a device such as a memory may be used as necessary in achieving the control unit 24. The control unit 24 may be achieved by a computer. In other words, all or a part of the control unit 24 may be achieved by cooperation of hardware resources such as a central processing unit (CPU) and a memory included in the computer and software (program) that defines operation of the CPU and the like. As another example, the control unit 24 may be achieved by a digital signal processor (DSP), an application specific integrated circuit (ASIC), a field programmable gate array (FPGA), or the like.

The invention claimed is:

1. A display apparatus for a vehicle, comprising:
 a road surface drawing unit that is mounted on a vehicle, the road surface drawing unit being configured to draw a notification display on a road surface with light; and
 a control unit configured to,
  in response to a switch for turning off the drawing being selected and a shift position of the vehicle being a P range, permit turning off the light of the drawing,
  in response to the switch being selected and the shift position of the vehicle being a D range, not permit turning off the light of the drawing,
  in response to the switch being selected and upon detecting no approaching object around the vehicle when the vehicle moves rearward, permit turning off the light of the drawing, and
 in response to the switch being selected and upon detecting an approaching object around the vehicle when the vehicle moves rearward, not permit turning off the light of the drawing.

2. The display apparatus according to claim 1, wherein the control unit is configured to,
 in response to a turn signal switch or a hazard switch being selected and the shift position of the vehicle being the D range when the switch for turning off the drawing is selected, cause the road surface drawing unit to draw the notification display on the road surface, and
 in response to the shift position of the vehicle being a reverse range and upon detecting an approaching object around the vehicle when the switch for turning off the drawing is selected, cause the road surface drawing unit to draw the notification display on the road surface.

3. The display apparatus according to claim 1, wherein the control unit is configured to determine whether drawing of the notification display is necessary based on output from at least one of a starting switch sensor of the vehicle, a shift sensor of the vehicle, a braking brake sensor of the vehicle, a steering angle sensor of the vehicle, a speed sensor of the vehicle, a position information acquiring unit of the vehicle, a radar sensor of the vehicle, a direction indicator sensor of the vehicle, or a photographing unit of the vehicle.

4. The display apparatus according to claim 1, wherein the road surface drawing unit is configured to change brightness, color, shape, irradiation position, and irradiation range of the notification display.

5. The display apparatus according to claim 4, wherein the notification display includes at least three marks arranged in a line.

6. The display apparatus according to claim 1, wherein the road surface drawing unit includes a light source and a light deflecting device, and
 the light deflecting device is configured to emit light from the light source to outside of the display apparatus.

7. The display apparatus according to claim 6, wherein the light deflecting device comprises a micro mirror device.

8. The display apparatus according to claim 2, wherein the control unit is configured to determine whether drawing of the notification display is necessary based on output from at least one of a starting switch sensor of the vehicle, a shift sensor of the vehicle, a braking brake sensor of the vehicle, a steering angle sensor of the vehicle, a speed sensor of the vehicle, a position information acquiring unit of the vehicle, a radar sensor of the vehicle, a direction indicator sensor of the vehicle, or a photographing unit of the vehicle.

9. The display apparatus according to claim 2, wherein the road surface drawing unit is configured to change brightness, color, shape, irradiation position, and irradiation range of the notification display.

10. The display apparatus according to claim 9, wherein the notification display includes at least three marks arranged in a line.

11. The display apparatus according to claim 2, wherein
the road surface drawing unit includes a light source and
   a light deflecting device, and
the light deflecting device is configured to emit light from
   the light source to outside of the display apparatus.

12. The display apparatus according to claim 11, wherein
the light deflecting device comprises a micro mirror
   device.

\* \* \* \* \*